United States Patent
Yuan et al.

(10) Patent No.: US 10,204,418 B2
(45) Date of Patent: Feb. 12, 2019

(54) METHOD AND APPARATUS FOR FACILITATING STEREO VISION THROUGH THE USE OF MULTI-LAYER SHIFTING

(71) Applicant: Nokia Technologies Oy, Espoo (FI)

(72) Inventors: Bodi Yuan, Palo Alto, CA (US); Muninder Veldandi, San Jose, CA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/258,737

(22) Filed: Sep. 7, 2016

(65) Prior Publication Data

US 2018/0068450 A1    Mar. 8, 2018

(51) Int. Cl.
*G06K 9/00* (2006.01)
*G06T 7/136* (2017.01)
(Continued)

(52) U.S. Cl.
CPC ............ *G06T 7/136* (2017.01); *G06T 7/0081* (2013.01); *G06T 7/194* (2017.01); *G06T 7/408* (2013.01);
(Continued)

(58) Field of Classification Search
CPC ... H04N 2013/0074; H04N 2013/0081; H04N 13/00; H04N 13/0456; H04N 13/0477;
(Continued)

(56) References Cited

U.S. PATENT DOCUMENTS

| | | | |
|---|---|---|---|
| 5,852,673 A | 12/1998 | Young | |
| 7,720,282 B2 | 5/2010 | Blake et al. | |
| 8,565,520 B2 | 10/2013 | Williams et al. | |
| 9,013,544 B2 * | 4/2015 | Satoh | G02B 13/0065 348/36 |

(Continued)

FOREIGN PATENT DOCUMENTS

| | | |
|---|---|---|
| CN | 102999943 | 3/2013 |
| KR | 101348929 | 1/2014 |

OTHER PUBLICATIONS

Sawhney; "Simplifying motion and structure analysis using planar parallax and image warping"; Pattern recognition, Oct. 1994. vol. 1; Conference A: Computer vision & image processing., proceedings of the 12th IAPR international converence on.*

Kumar et al.; "Shape recovery from multuple views: a parallax based approach"; Pattern recognition, Oct. 1994. vol. 1; Conference A: Computer vision & image processing., proceedings of the 12th IAPR international converence on.*

(Continued)

*Primary Examiner* — Euengnan Yeh
(74) *Attorney, Agent, or Firm* — Alston & Bird LLP

(57) ABSTRACT

A method, apparatus and computer program products are provided for facilitating stereo vision through the use of multi-layer shifting. One example method includes receiving a first RGB image and a second RGB image, each captured from a different position, generating corresponding depth images, performing a first segmentation on the depth images, performing a second segmentation on the RGB images resulting in a first object mask and a second object mask, stitching of the background layers to form a background layer, generating a series of images comprising a first image representative of a view from the first position and a second image representative of a view from the second position, the series of images demonstrating a shifting of an (Continued)

object layer occurring at a higher speed than a shifting of the background layer.

21 Claims, 5 Drawing Sheets

(51) Int. Cl.
 *G06T 7/00* (2017.01)
 *G06T 7/40* (2017.01)
 *G06T 7/194* (2017.01)

(52) U.S. Cl.
 CPC ............... *G06T 2207/10012* (2013.01); *G06T 2207/10024* (2013.01); *G06T 2207/10028* (2013.01); *G06T 2207/20036* (2013.01)

(58) Field of Classification Search
 CPC ............ H04N 13/0203; G06K 2209/40; G06T 2207/10021; G06T 2207/10012; G06T 2207/10028
 See application file for complete search history.

(56) References Cited

U.S. PATENT DOCUMENTS

| | | |
|---|---|---|
| 9,210,400 B2 | 12/2015 | Lee et al. |
| 9,338,433 B2 | 5/2016 | Lee et al. |
| 2017/0098298 A1* | 4/2017 | Nishijima ............... G06T 7/004 |

OTHER PUBLICATIONS

Kolmogorov, V. et al., *Bi-layer segmentation of bionocular stereo video*, Microsoft Research Ltd. [online] [retrieved Jan. 25, 2017]. Retrieved from the internet: <URL: http://pub.ist.ac.at/~vnk/papers/StereoSegmentation_CVPR05.pdf>. 8 pages.

* cited by examiner

METHOD AND APPARATUS FOR FACILITATING STEREO VISION THROUGH THE USE OF MULTI-LAYER SHIFTING

TECHNOLOGICAL FIELD

Embodiments of the present invention relate generally to utilizing image processing, stereo vision, image segmentation techniques to counteract the effects of occlusion, and in particular to various methods, apparatus, and computer program products for facilitating stereo vision through the use of multi-layer shifting.

BACKGROUND

While conventional techniques may attempt to utilize scene panoramas to construct stereo vision views, occlusion occurs during the view movement, and as such, the scene lacks reality. The present application provides for the interpolation of the views between two scenes taken from different positions giving consideration to the occlusion effect, which will result in the generation of a scene with more reality.

FIG. 5 shows a diagram demonstrating occlusion when conventional techniques are used to generated scenes. For example, when an image capturing device at position A will capture an image in which the two spheres overlap, whereas at position B, the image capturing device will capture an image in which the two spheres do not overlap. FIG. 6A shows an image of the two overlapped spheres in position A, while FIG. 6B shown an image where the two spheres, if using a panoramic image, will still have overlap when the user moves to the position B and the only change is the view of the panoramic image will shift. The view shown in FIG. 2B lacks reality.

In this regard, areas for improving known and existing systems have been identified. Through applied effort, ingenuity, and innovation, solutions to improve such systems have been realized and are described in connection with embodiments of the present invention

BRIEF SUMMARY

A method, apparatus and computer program product are therefore provided according to an example embodiment of the present invention for facilitating stereo vision through the use of multi-layer shifting. That is, embodiments of the present invention are directed to solving the problem of occlusion in stereo vision by cutting images into several layers and shifting different layers with different speeds, which may give the same or similar effect of the view of movement in the real world.

In some embodiments, an advantages of the methods described herein is that the problem of occlusion in stereo vision may be fixed. Moreover, embodiments, described herein require low computational complexity.

In some embodiments, a method may be provided, the method comprising receiving at least a first image, the first image comprising an object captured from a first position, and a second image, the second image comprising the object captured from a second position, the first position being different than the second position, receiving at least a first depth image, the first depth image corresponding to the first image, and a second depth image, the second depth image corresponding to the second image, causing a first segmentation, the first segmentation performed on the first depth image and the second depth image, and based on pre-defined threshold values, the first segmentation resulting in a set of images comprising a first object mask and a second object mask, causing a second segmentation, the second segmentation performed on the first image and the second image and utilizing the first object mask and the second object mask as constraints, the second segmentation resulting in a set of segments comprising a first object image, a second object image, a first background layer, and a second background layer, causing stitching of the first background layer and the second background layer to form a background layer, and generating a series of images, the series of images comprising a first image representative of a view from the first position and a second image representative of a view from the second position, the series of images demonstrating a shifting of an object layer occurring at a higher speed than a shifting of the background layer.

In some embodiments, the first image comprises the first object image interpolated with the background layer and the second image comprises the second object image interpolated with the background layer. In some embodiments, the second segmentation is performed in accordance with a maximum flow minimum cut algorithm.

In some embodiments, the method may further comprise a first hole filling step resulting from the stitching of the first background layer and the second background layer, and a second hole filling step comprising implementing a process to average values associated with nearby valid pixels, and setting the average as a new value for the pixels in a black area.

In some embodiments, the first segmentation step further comprises generating the first depth image and the second depth image from the first image and the second image respectively.

In some embodiments, the method may further comprise setting the pre-defined threshold values corresponding to a distance, and identifying an object layer utilizing the person's shape mask from the depth image segmentation, determining an inverse of the image, and making the inverse into the background mask. In some embodiments, the speed at which the shifting of layers differs is indirectly proportional to the distance between the object layer and the background layer.

In some embodiments, an apparatus may be provided, the apparatus comprising at least one processor and at least one memory including computer program code, the at least one memory and the computer program code configured to, with the processor, cause the apparatus to at least receive at least a first image, the first image comprising an object captured from a first position, and a second image, the second image comprising the object captured from a second position, the first position being different than the second position, receive at least a first depth image, the first depth image corresponding to the first image, and a second depth image, the second depth image corresponding to the second image, causing a first segmentation, the first segmentation performed on the first depth image and the second depth image, and based on pre-defined threshold values, the first segmentation resulting in a set of images comprising a first object mask and a second object mask, cause a second segmentation, the second segmentation performed on the first image and the second image and utilizing the first object mask and the second object mask as constraints, the second segmentation resulting in a set of segments comprising a first object image, a second object image, a first background layer, and a second background layer, cause stitching of the first background layer and the second background layer to form a background layer, and generate a series of images, the series of images comprising a first image representative of a view from the first position and a second image representative of a view from the second position, the series of images demonstrating a shifting of an object layer occurring at a higher speed than a shifting of the background layer.

In some embodiments, the first image comprises the first object image interpolated with the background layer and the second image comprises the second object image interpolated with the background layer. In some embodiments, the second segmentation is performed in accordance with a maximum flow minimum cut algorithm.

In some embodiments, the at least one memory and the computer program code are further configured to, with the processor, cause the apparatus to perform a first hole filling step resulting from the stitching of the first background layer and the second background layer, and perform a second hole filling step comprising implementing a process to average values associated with nearby valid pixels, and setting the average as a new value for the pixels in a black area.

In some embodiments, the first segmentation step further comprises generating the first depth image and the second depth image from the first image and the second image respectively. In some embodiments, the at least one memory and the computer program code are further configured to, with the processor, cause the apparatus to set the pre-defined threshold values corresponding to a distance, and identify an object layer utilizing the person's shape mask from the depth image segmentation, determining an inverse of the image, and making the inverse into the background mask.

In some embodiments, the speed at which the shifting of layers differs is indirectly proportional to the distance between the object layer and the background layer.

In some embodiments, a computer program product may be provided comprising at least one non-transitory computer-readable storage medium having computer-executable program code instructions stored therein, the computer-executable program code instructions comprising program code instructions for receiving at least a first image, the first image comprising an object captured from a first position, and a second image, the second image comprising the object captured from a second position, the first position being different than the second position, receiving at least a first depth image, the first depth image corresponding to the first image, and a second depth image, the second depth image corresponding to the second image, causing a first segmentation, the first segmentation performed on the first depth image and the second depth image, and based on pre-defined threshold values, the first segmentation resulting in a set of images comprising a first object mask and a second object mask, causing a second segmentation, the second segmentation performed on the first image and the second image and utilizing the first object mask and the second object mask as constraints, the second segmentation resulting in a set of segments comprising a first object image, a second object image, a first background layer, and a second background layer, causing stitching of the first background layer and the second background layer to form a background layer, and generating a series of images, the series of images comprising a first image representative of a view from the first position and a second image representative of a view from the second position, the series of images demonstrating a shifting of an object layer occurring at a higher speed than a shifting of the background layer.

In some embodiments, the first image comprises the first object image interpolated with the background layer and the second image comprises the second object image interpolated with the background layer. In some embodiments, the second segmentation is performed in accordance with a maximum flow minimum cut algorithm.

In some embodiments, the computer-executable program code instructions further comprise program code instructions for a first hole filling step resulting from the stitching of the first background layer and the second background layer, and a second hole filling step comprising implementing a process to average values associated with nearby valid pixels, and setting the average as a new value for the pixels in a black area.

In some embodiments, the first segmentation step further comprises generating the first depth image and the second depth image from the first image and the second image respectively. In some embodiments, the computer-executable program code instructions further comprise program code instructions for setting the pre-defined threshold values corresponding to a distance, and identifying an object layer utilizing the person's shape mask from the depth image segmentation, determining an inverse of the image, and making the inverse into the background mask.

In some embodiments, the speed at which the shifting of layers differs is indirectly proportional to the distance between the object layer and the background layer.

BRIEF DESCRIPTION OF THE DRAWINGS

Figure 1:
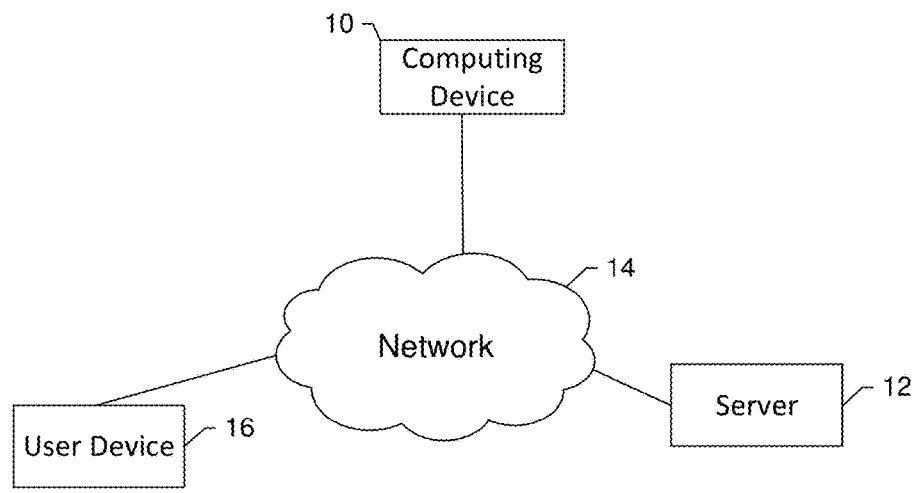
Figure 2:
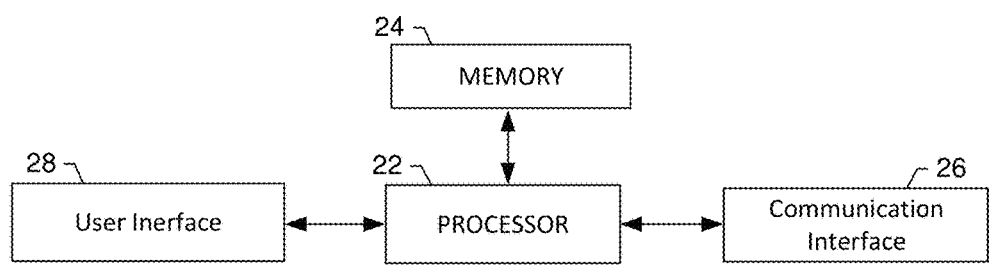
Figure 3:
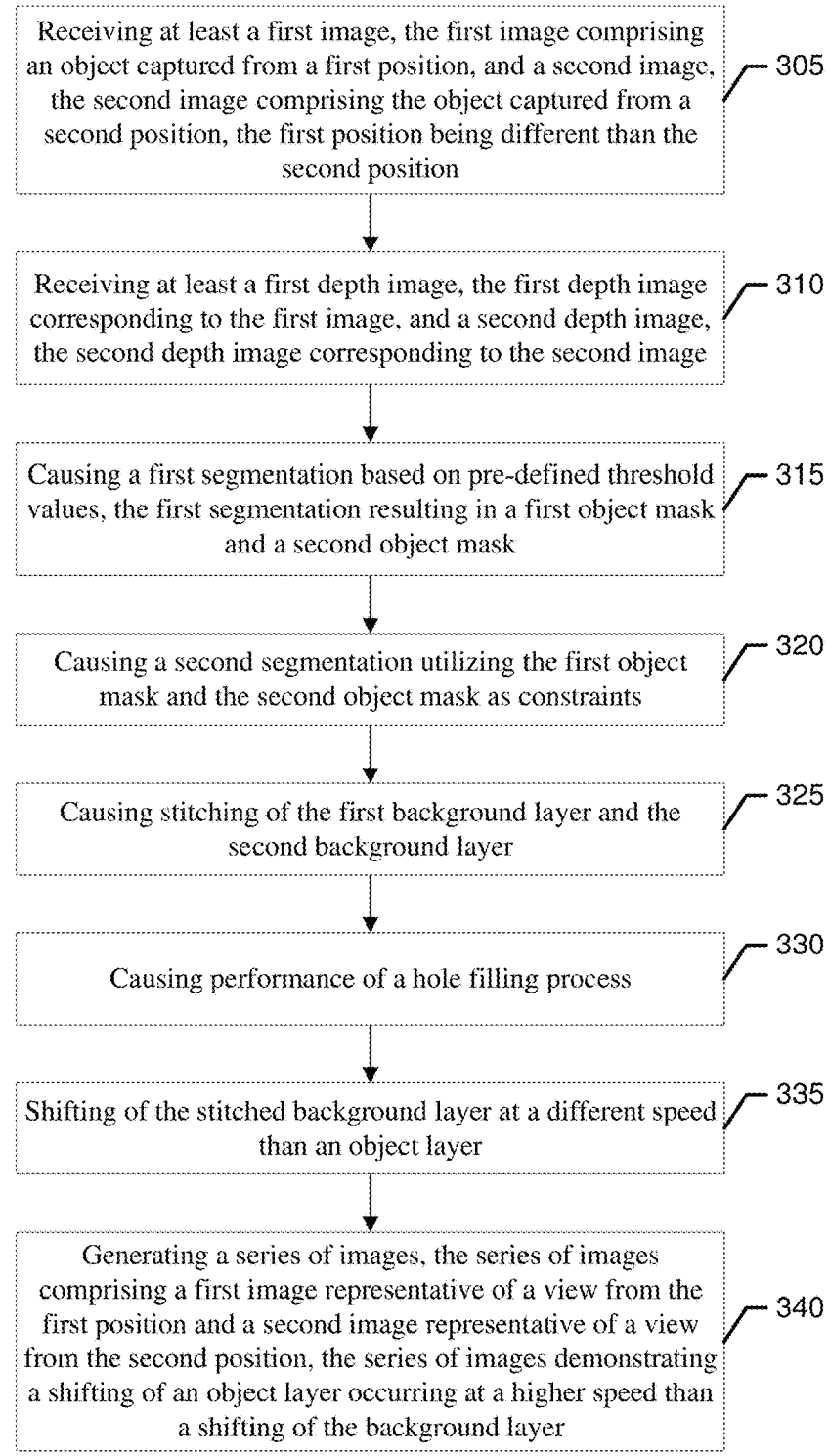
Figure 4:
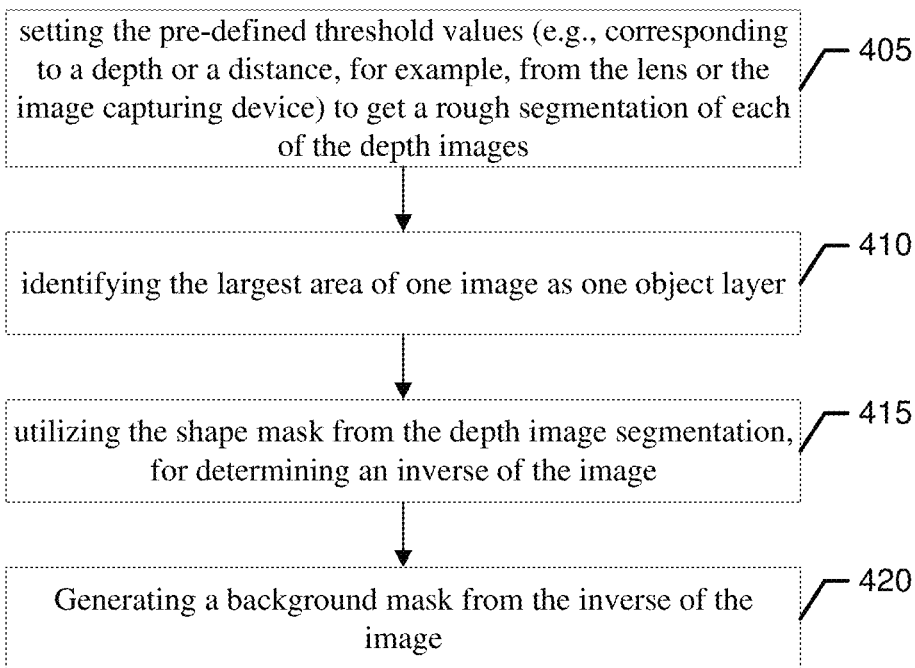
Figure 5:
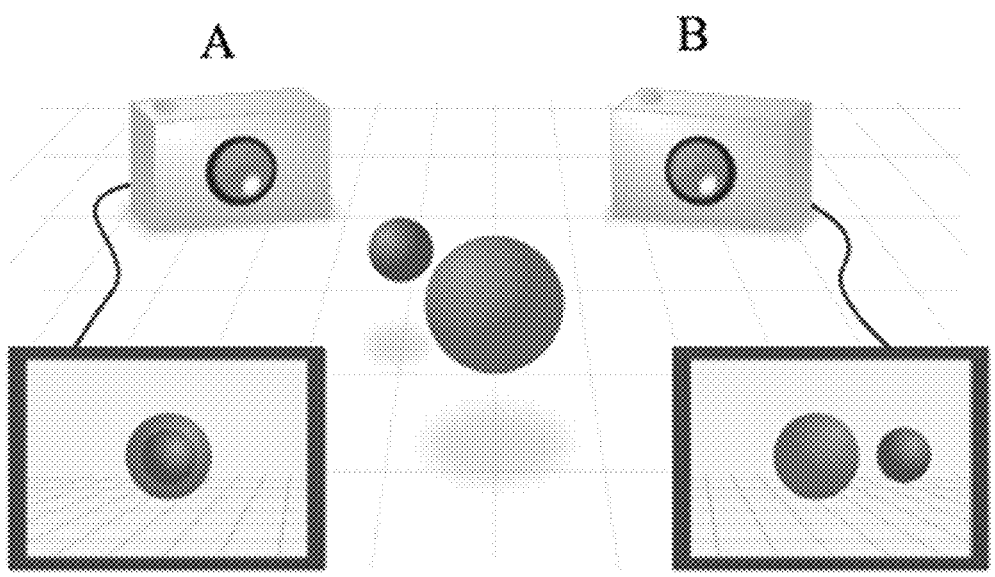
Figure 6A:
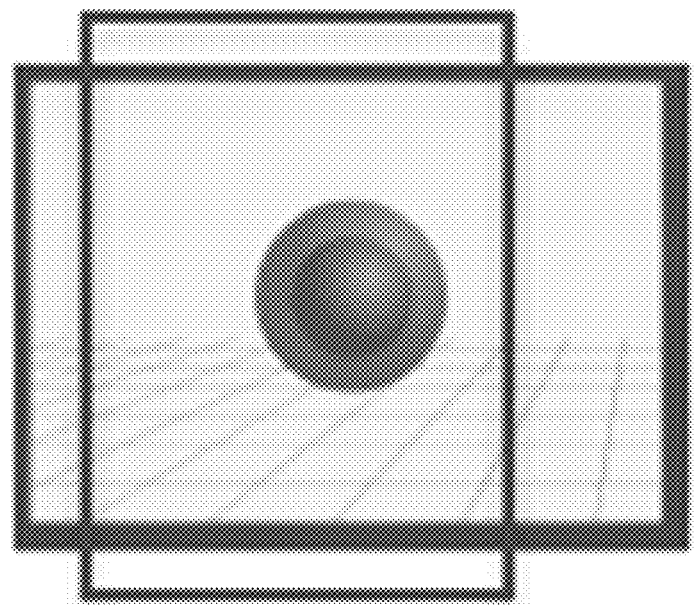
Figure 6B:
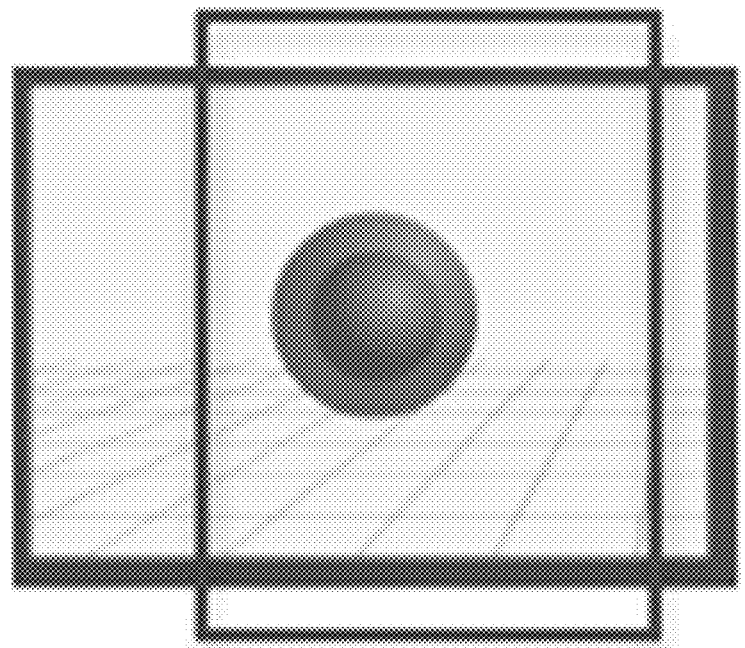

Having thus described embodiments of the invention in general terms, reference will now be made to the accompanying drawings, which are not necessarily drawn to scale, and wherein:

FIG. 1 is block diagram of a system that may be specifically configured in accordance with an example embodiment of the present invention;

FIG. 2 is a block diagram of an apparatus that may be specifically configured in accordance with an example embodiment of the present invention;

FIG. 3 is a flowchart illustrating an exemplary method of operating an example apparatus in accordance with an embodiment of the present invention;

FIG. 4 is a flowchart illustrating an exemplary method of operating an example apparatus in accordance with an embodiment of the present invention; and FIGS. 5, 6A, and 6B are a series of diagrams illustrating the occlusion affect.

DETAILED DESCRIPTION

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term "circuitry" refers to all of the following: (a) hardware-only circuit implementations (such as implementations in only analog and/or digital circuitry);

(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or application specific integrated circuit for a mobile phone or a similar integrated circuit in a server, a cellular network device, or other network device.

Referring now of FIG. 1, a system that supports communication, either wirelessly or via a wireline, between a computing device 10, a server 12 or other network entity (hereinafter generically referenced as a "server"), and a user device 16 is illustrated. As shown, the computing device 10, the server 12, and the user device 16 may be in communication via a network 14, such as a wide area network, such as a cellular network or the Internet or a local area network. However, the computing device and the server may be in communication in other manners, such as via direct communications between the computing device and the server.

The computing device 10 or the user device 16 may be embodied by a number of different devices including mobile computing devices, such as a personal digital assistant (PDA), mobile telephone, smartphone, laptop computer, tablet computer, or any combination of the aforementioned, and other types of voice and text communications systems. Alternatively, the computing device 10 and/or user device 16 may be a fixed computing device, such as a personal computer, a computer workstation or the like. The server 12 may also be embodied by a computing device and, in one embodiment, is embodied by a web server. Additionally, while the system of FIG. 1 depicts a single server, the server may be comprised of a plurality of servers which may collaborate to support browsing activity conducted by the computing device. The user device 16 may be embodied by a computing device 10, and in one embodiment, may be comprised of a plurality of computing devices.

The network 14 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. In this regard, the communications interface 308 may be capable of operating with one or more air interface standards, communication protocols, modulation types, access types, and/or the like. More particularly, the system 302, the communications interface 308 or the like may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Regardless of the type of device that embodies the computing device 10 or user device 16, the computing device 10 or user device 16 may include or be associated with an apparatus 20 as shown in FIG. 2. In this regard, the apparatus may include or otherwise be in communication with a processor 22, a memory device 24, a communication interface 26 and a user interface 28. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 22 (and/or co-processors or any other processing circuitry assisting or otherwise associated with the processor) may be in communication with the memory device 24 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 20 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device 10 configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a head mounted display) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In one embodiment, the processor may also include user interface circuitry configured to control at least some functions of one or more elements of the user interface 28.

Meanwhile, the communication interface 26 may be any means such as a device or circuitry embodied in either hardware or a combination of hardware and software that is configured to receive and/or transmit data between the computing device 10 and a server 12. In this regard, the communication interface 26 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with the head mounted displays 10, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

The user interface 28 may be in communication with the processor 22, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. The user interface may also be in communication with the memory 24 and/or the communication interface 26, such as via a bus.

In an example embodiment, components/modules of the apparatus 20 may be implemented using standard programming techniques. For example, the apparatus 20 may be implemented as a "native" executable running on the processor 22, along with one or more static or dynamic libraries. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

In addition, programming interfaces to the data stored as part of the apparatus 20, can be made available by standard mechanisms such as through C, C++, C#, and Java APIs; libraries for accessing files, databases, or other data repositories; through languages such as XML; or through Web servers, FTP servers, or other types of servers providing access to stored data. A data store may also be included and it may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the apparatus 20 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FP- GAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Some or all of the system components and data structures may also be stored as a web application, "app", or any HTML5 or JavaScript™ application, such as a computer software application that is coded in a browser-supported programming language (such as JavaScript™) combined with a browser-rendered markup language like HTML5, reliant on a common web browser to render the application executable. The opening of a web page or "app" may be performed by a web browser on computing device 10. An HTML5 or JavaScript™ "app" allows web page script to contact a server 12, such as those shown in FIG. 1, for storing and retrieving data without the need to re-download an entire web page. Some or all of the system components and data structures may also be stored as a privileged web application or privileged web app. A privileged web app is a piece of web content that may have been verified by, for example, means of an app store or stores or may have obtained or downloaded from a source that is trusted source. A trusted source may provide a privileged web app that may be enabled to override the default power settings. Such computer program products may also take other forms in other embodiments. Accordingly, embodiments of this disclosure may be practiced with other computer system configurations.

FIGS. 3 and 4 illustrate example flowcharts of the example operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 26 of an apparatus employing an embodiment of the present invention and executed by a processor 24 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 3 and 4, when executed, convert a computer or processing circuitry into a particular machine configured to perform an example embodiment of the present invention. Accordingly, the operations of FIGS. 3 and 4 define an algorithm for configuring a computer or processing to perform an example embodiment. In some cases, a general purpose computer may be provided with an instance of the processor which performs the algorithms of FIGS. 3 and 4 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included. It should be appreciated that each of the modifications, optional additions or amplifications below may be included with the operations above either alone or in combination with any others among the features described herein.

In one example embodiment, a method, apparatus and/or computer program product may be provided for facilitating stereo vision through the use of multi-layer shifting. FIG. 3 is an example flowchart illustrating a method of operating an example mobile terminal, performed in accordance with an embodiment of the present invention. Specifically FIG. 3 shows an example method for generating a series of images demonstrating a shifting of an object layer occurring at a higher speed than a shifting of the background layer.

First, as shown in block 305 of FIG. 3, the apparatus 20 embodied by the computing device 10 may be configured to receive or otherwise access at least a first image and a second image. The apparatus embodied by the computing device may therefore include means, such as the processor 22, the communication interface 26 or the like, for receiving and/or accessing at least a first image and a second image. In some embodiments, the first image comprises an object captured from a first position, and the second image comprises the object captured from a second position, the first position being different than the second position. In some embodiments, the optical axes of the image capturing device or lens of capturing the first image and the second image are parallel. The first image and the second image may be red-green-blue (RGB) images.

The process also makes use of depth images, which may be separately captured or generated from the RGB images. Accordingly, as shown in block 310 of FIG. 3, the apparatus 20 embodied by the computing device 10 may be configured to receive or otherwise access at least a first depth image and a second depth image. The apparatus embodied by the computing device may therefore include means, such as the processor 22, the communication interface 26 or the like, for receiving or accessing at least a first depth image, the first depth image corresponding to the first image, and a second depth image, the second depth image corresponding to the second image. In some embodiments, the depth images may be captured by and/or received from, for example, a depth camera. In other embodiments, the depth images may be constructed by or generated using the first and second images (e.g., the RGB images).

As shown in block 315 of FIG. 3, the apparatus 20 embodied by the computing device 10 may then therefore be configured to cause a first segmentation. The apparatus embodied by the computing device may therefore include means, such as the processor 22, the communication interface 26 or the like, for causing a first segmentation. As one or ordinary skill would appreciate, segmentation is the process of partitioning an image (e.g., a digital image) into a plurality of segments, for example, to change the representation of the image such that the image is easier to analyze or may be analyzed differently. In some embodiments, the first segmentation may be based on pre-defined threshold values and for example, may result in a set of images that may comprise any combination of, for example, a first object mask, an inverse of the first object mask (e.g., a background mask of the first image) and a second object mask, and an inverse of the second object mask (e.g., a background mask of the second image).

FIG. 4, which will be described below, is a flowchart illustrating an exemplary method of operating an example mobile terminal, performed in accordance with an embodiment of the present invention. Specifically FIG. 4 shows an example method for performing the first segmentation. That is, as described below, a second segmentation may be performed. However, before the second segmentation may provide the first object mask and the second object mask used in the performance of the second segmentation. For example, in some embodiments, the first segmentation may comprise setting the pre-defined threshold values (e.g., corresponding to a depth or a distance, for example, from the lens or the image capturing device) to get a rough segmentation of each of the depth images. Moreover, in some embodiments, the apparatus may be configured to identify, for example, the largest area of one image (e.g., the first image) as one object layer (e.g., identifying the person in the first image), the identification comprising utilizing the shape mask from the depth image segmentation, determining an inverse of the image, and making the inverse into the background mask.

Returning now to FIG. 3, as shown in block 320 of FIG. 3, the apparatus 20 embodied by the computing device 10 may then therefore be configured to cause performance of a second segmentation. The apparatus embodied by the computing device may therefore include means, such as the processor 22, the communication interface 26 or the like, for causing performance of a second segmentation. The second segmentation may be performed on the first image and the second image (e.g., the RGB images). In some embodiments, the second segmentation may be performed, for example, using a max flow min cut algorithm. However, one or ordinary skill would appreciate that segmentation may be performed by any number of processes. The second segmentation may results in a first object image, a first background image, a second object image, and a second background image.

Using the output of the segmentation steps described above, as shown in block 325 of FIG. 3, the apparatus 20 embodied by the computing device 10 may then be configured to stitch or cause stitching of the first background layer and the second background layer. The apparatus embodied by the computing device may therefore include means, such as the processor 22, the communication interface 26 or the like, for stitching or causing stitching of the first background layer and the second background layer.

In the stitching together of the first background layer and the second background layer, a portion of the holes that exist will be filled. As shown in block 330 of FIG. 3, the apparatus 20 embodied by the computing device 10 may then therefore be configured to cause the performance of a hold filling process. The apparatus embodied by the computing device may therefore include means, such as the processor 22, the communication interface 26 or the like, for causing the performance of a hole filling process. For example, because of a warping effect, there may still be some portion of holes that may need filling after stitching. In some embodiments, the apparatus may be configured to implement a process to average nearby valid pixels' value as a new value for the pixels in the black area (i.e. the area in need of fill).

As discussed above, to demonstrate reality, as a view changes from a first position to a second position, the objects in the foreground generally may be required to move at a different speed than those object in the background. As shown in block 335 of FIG. 3, the apparatus 20 embodied by the computing device 10 may then therefore be configured to cause a shifting of the stitched background layer at a different speed than an object layer. The apparatus embodied by the computing device may therefore include means, such as the processor 22, the communication interface 26 or the like, for causing a shifting of the stitched background layer at a different speed than an object layer.

In some embodiments, the speed at which the object layer is shifted may be higher, for example, due to the distance being closer. The specific speed parameters may depend on the distance of the image capturing device or lens and, in some embodiments, additionally, a movement speed of the user.

As shown in block 340 of FIG. 3, the apparatus 20 embodied by the computing device 10 may then therefore be configured to generate a series of images demonstrating a shifting of an object layer occurring at a higher speed than a shifting of the background layer. The apparatus embodied by the computing device may therefore include means, such as the processor 22, the communication interface 26 or the like, for generating a series of images, the series of images comprising a first image representative of a view from the first position and a second image representative of a view from the second position, the series of images demonstrating a shifting of an object layer occurring at a higher speed than a shifting of the background layer. In some embodiments, the first image comprises the first object image interpolated with the background layer and the second image comprises the second object image interpolated with the background layer.

As described above, FIG. 4 is a flowchart illustrating an exemplary method of operating an example mobile terminal, performed in accordance with an embodiment of the present invention. Specifically FIG. 4 shows an example method for performing the first segmentation. As described above, preceding the second segmentation, the first segmentation may be performed. As shown in block 405 of FIG. 4, the apparatus 20 embodied by the computing device 10 may then therefore be configured to set the pre-defined threshold values to perform segmentation of each of the depth images. The apparatus embodied by the computing device may therefore include means, such as the processor 22, the communication interface 26 or the like, for setting the pre-defined threshold values (e.g., corresponding to a depth or a distance, for example, from the lens or the image capturing device) to get a rough segmentation of each of the depth images.

Subsequently, as shown in block 410 of FIG. 4, the apparatus 20 embodied by the computing device 10 may then therefore be configured to identify, for example, the largest area of one image (e.g., the first depth image or the depth second image) as one object layer (e.g., identifying the person in the first depth image). The apparatus embodied by the computing device may therefore include means, such as the processor 22, the communication interface 26 or the like, for identifying the largest area of one image as one object layer.

As shown in block 415 of FIG. 4, the apparatus 20 embodied by the computing device 10 may then therefore be configured to utilize the shape mask from the depth image segmentation, to determine an inverse of the image. The apparatus embodied by the computing device may therefore include means, such as the processor 22, the communication interface 26 or the like, for utilizing the shape mask from the depth image segmentation, for determining an inverse of the image. As shown in block 420 of FIG. 4, the apparatus 20 embodied by the computing device 10 may then therefore be configured to generate a background mask from the inverse. The apparatus embodied by the computing device may therefore include means, such as the processor 22, the communication interface 26 or the like, for making the inverse into the background mask.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving at least a first image, the first image comprising an object captured from a first position, and a second image, the second image comprising the object captured from a second position, the first position being different than the second position;
   receiving at least a first depth image, the first depth image corresponding to the first image, and a second depth image, the second depth image corresponding to the second image;
   causing a first segmentation, the first segmentation performed on the first depth image and the second depth image, and based on pre-defined threshold values, the first segmentation resulting in a set of images comprising a first object mask and a second object mask;
   causing a second segmentation, the second segmentation performed on the first image and the second image and utilizing the first object mask and the second object mask as constraints, the second segmentation resulting in a set of segments comprising a first object image, a second object image, a first background layer, and a second background layer;
   causing stitching of the first background layer and the second background layer to form a background layer; and
   generating a series of images, the series of images representative of a plurality of changing views of the object against the background layer due to a change in position of a viewer, the series of images comprising at least a first image representative of a view of the object from the first position comprising the first object image and a second image representative of a view of the object from the second position comprising the second object image, the series of images demonstrating a shifting of an object layer occurring at a higher speed than a shifting of the background layer.

2. The method according to claim 1, wherein the first image comprises the first object image interpolated with the background layer and the second image comprises the second object image interpolated with the background layer.

3. The method according to claim 1, wherein the second segmentation is performed in accordance with a maximum flow minimum cut algorithm.

4. The method according to claim 1, further comprising:
   a first hole filling step resulting from the stitching of the first background layer and the second background layer; and
   a second hole filling step comprising: implementing a process to average values associated with valid pixels in a nearby area; and setting the average as a new value for the pixels in the nearby area in need of fill.

5. The method according to claim 1, wherein the first segmentation step further comprises: generating the first depth image and the second depth image from the first image and the second image respectively.

6. The method according to claim 1, further comprising:
   setting the pre-defined threshold values corresponding to a distance; and
   identifying the object layer utilizing a person's shape mask from the depth image segmentation, determining an inverse of the object layer, and making the inverse into the background layer.

7. The method according to claim 1, wherein the speed at which the shifting of layers differs is indirectly proportional to the distance between the object layer and the background layer.

8. An apparatus comprising at least one processor and at least one memory including computer program code, the at least one memory and the computer program code configured to, with the processor, cause the apparatus to at least:
   receive at least a first image, the first image comprising an object captured from a first position, and a second image, the second image comprising the object captured from a second position, the first position being different than the second position;

receive at least a first depth image, the first depth image corresponding to the first image, and a second depth image, the second depth image corresponding to the second image;

causing a first segmentation, the first segmentation performed on the first depth image and the second depth image, and based on pre-defined threshold values, the first segmentation resulting in a set of images comprising a first object mask and a second object mask;

cause a second segmentation, the second segmentation performed on the first image and the second image and utilizing the first object mask and the second object mask as constraints, the second segmentation resulting in a set of segments comprising a first object image, a second object image, a first background layer, and a second background layer;

cause stitching of the first background layer and the second background layer to form a background layer; and generate a series of images, the series of images representative of a plurality of changing views of the object against the background layer due to a change in position of a viewer, the series of images comprising at least a first image representative of a view of the object from the first position comprising the first object image and a second image representative of a view of the object from the second position comprising the second object image, the series of images demonstrating a shifting of an object layer occurring at a higher speed than a shifting of the background layer.

9. The apparatus according to claim 8, wherein the first image comprises the first object image interpolated with the background layer and the second image comprises the second object image interpolated with the background layer.

10. The apparatus according to claim 8, wherein the second segmentation is performed in accordance with a maximum flow minimum cut algorithm.

11. The apparatus according to claim 8, wherein the at least one memory and the computer program code are further configured to, with the processor, cause the apparatus to:

perform a first hole filling step resulting from the stitching of the first background layer and the second background layer; and perform a second hole filling step comprising: implementing a process to average values associated with valid pixels in a nearby area; and setting the average as a new value for the pixels in the nearby area in need of fill.

12. The apparatus according to claim 8, wherein the first segmentation step further comprises: generating the first depth image and the second depth image from the first image and the second image respectively.

13. The apparatus according to claim 8, wherein the at least one memory and the computer program code are further configured to, with the processor, cause the apparatus to:

set the pre-defined threshold values corresponding to a distance; and identify the object layer utilizing a person's shape mask from the depth image segmentation, determining an inverse of the object layer, and making the inverse into the background layer.

14. The apparatus according to claim 8, wherein the speed at which the shifting of layers differs is indirectly proportional to the distance between the object layer and the background layer.

15. A computer program product comprising at least one non-transitory computer-readable storage medium having computer-executable program code instructions stored therein, the computer-executable program code instructions comprising program code instructions, executed by at least one processor, for:

receiving at least a first image, the first image comprising an object captured from a first position, and a second image, the second image comprising the object captured from a second position, the first position being different than the second position;

receiving at least a first depth image, the first depth image corresponding to the first image, and a second depth image, the second depth image corresponding to the second image;

causing a first segmentation, the first segmentation performed on the first depth image and the second depth image, and based on pre-defined threshold values, the first segmentation resulting in a set of images comprising a first object mask and a second object mask;

causing a second segmentation, the second segmentation performed on the first image and the second image and utilizing the first object mask and the second object mask as constraints, the second segmentation resulting in a set of segments comprising a first object image, a second object image, a first background layer, and a second background layer;

causing stitching of the first background layer and the second background layer to form a background layer; and generating a series of images, the series of images representative of a plurality of changing views of the object against the background layer due to a change in position of a viewer, the series of images comprising at least a first image representative of a view of the object from the first position comprising the first object image and a second image representative of a view of the object from the second position comprising the second object image, the series of images demonstrating a shifting of an object layer occurring at a higher speed than a shifting of the background layer.

16. The computer program product according to claim 15, wherein the first image comprises the first object image interpolated with the background layer and the second image comprises the second object image interpolated with the background layer.

17. The computer program product according to claim 15, wherein the second segmentation is performed in accordance with a maximum flow minimum cut algorithm.

18. The computer program product according to claim 15, wherein the computer-executable program code instructions further comprise program code instructions for:

a first hole filling step resulting from the stitching of the first background layer and the second background layer; and a second hole filling step comprising: implementing a process to average values associated with valid pixels in a nearby area; and setting the average as a new value for the pixels in the nearby area in need of fill.

19. The computer program product according to claim 15, wherein the first segmentation step further comprises: generating the first depth image and the second depth image from the first image and the second image respectively.

20. The computer program product according to claim 15, wherein the computer-executable program code instructions further comprise program code instructions for:
- setting the pre-defined threshold values corresponding to a distance; and
- identifying the object layer utilizing a person's shape mask from the depth image segmentation, determining an inverse of the object layer, and making the inverse into the background layer.

21. The computer program product according to claim 15, wherein the speed at which the shifting of layers differs is indirectly proportional to the distance between the object layer and the background layer.

* * * * *